(12) United States Patent
Macartney-Filgate et al.

(10) Patent No.: US 8,781,895 B2
(45) Date of Patent: Jul. 15, 2014

(54) WEB CAMPAIGN PROMOTION SYSTEM AND METHOD

(75) Inventors: Bruce C. Macartney-Filgate, Austin, TX (US); Edelmiro Perez, Jr., Round Rock, TX (US); Carolyn C. Faour, Austin, TX (US); Neil Dholakia, Austin, TX (US)

(73) Assignee: Webad Campaign Analytics LP, Austin, TX (US)

(*) Notice: Subject to any disclaimer, the term of this patent is extended or adjusted under 35 U.S.C. 154(b) by 2246 days.

(21) Appl. No.: 11/358,149

(22) Filed: Feb. 21, 2006

(65) Prior Publication Data

US 2006/0143086 A1 Jun. 29, 2006

Related U.S. Application Data

(63) Continuation of application No. 09/739,064, filed on Dec. 18, 2000, now abandoned.

(60) Provisional application No. 60/172,279, filed on Dec. 17, 1999.

(51) Int. Cl.
*G06Q 30/02* (2012.01)
*H04H 60/33* (2008.01)

(52) U.S. Cl.
USPC .................. 705/14.41; 705/14.39; 705/14.49; 705/14.52; 725/14

(58) Field of Classification Search
CPC .......... G06Q 30/0239; G06Q 30/0242; G06Q 30/0251; G06Q 30/0254; H04H 60/33
USPC ......... 705/14.39, 14.41, 14.49, 14.52; 725/14
See application file for complete search history.

(56) References Cited

U.S. PATENT DOCUMENTS

| 5,848,396 | A | 12/1998 | Gerace |
|---|---|---|---|
| 6,408,278 | B1 | 6/2002 | Carney et al. |
| 2006/0143086 | A1* | 6/2006 | Macartney-Filgate et al. . 705/14 |

OTHER PUBLICATIONS

Definitions of "event" to "event-driven programming", Microsoft Press Computer Dictionary, $3^{rd}$ Ed. (Redmond, Washington: Microsoft Press, 1997).*
Definitions of "event" to "event-driven programming", Microsoft Press Computer Dictionary, 3rd Ed. (Redmond, Washington: Microsoft Press, 1997).*
Definition of "handler", Microsoft Press Computer Dictionary, $3^{rd}$ ed. (Redmond, Washington: Microsoft Press, 1997).*

* cited by examiner

*Primary Examiner* — Donald L. Champagne

(57) ABSTRACT

Events generated by customer interaction during an internet-based session are made available for use by a system for tracking the effectiveness of web advertising campaigns. Event occurrences are collected for evaluation to determine whether campaign goals are being met. Campaigns are defined by rules indicating which ad content is to be displayed to which customers. Event types to be reported are selected depending on the needs of the particular campaign.

29 Claims, 2 Drawing Sheets

WEB CAMPAIGN PROMOTION SYSTEM AND METHOD

CROSS-REFERENCE TO RELATED APPLICATION

This a Continuation of U.S. patent application Ser. No. 09/739,064 filed on Dec. 18, 2000 now abandoned titled SYSTEM AND METHOD FOR TRACKING WEB CAMPAIGN EFFECTIVENESS, which is hereby incorporated by reference, and which claims priority based upon Provisional Application Filing No. 60/172,279 filed Dec. 17, 1999 titled PERSONALIZED WEB CAMPAIGN PROMOTION SYSTEM WITH CAMPAIGN EFFECTIVENESS TRACKING.

BACKGROUND OF THE INVENTION

1. Field of the Invention

The present invention relates generally to computer systems that communicate on the Internet, and more specifically to a system and method for tracking the effectiveness of advertising campaigns over Internet systems.

2. Description of the Prior Art

Advertising over the Internet has become extremely common. In many cases, paid advertising is the primary source of revenue for Internet content providers. For others, advertisements can direct potential customers to additional products available, and promote products that the content provider wants or needs to sell.

An important goal of advertising, especially in a medium such as the Internet, is to direct the advertising to customers most likely to buy the product. Various types of customer profiling is becoming common, with choice of advertisements dynamically selected based upon information collected about the person accessing a web page, and upon purchasing or viewing patterns that person is currently demonstrating. An example of such advertising technique is found in U.S. Pat. No. 5,710,887, issued to Chelliah et al. Many other examples of advertising based upon purchaser identification are known in the art.

One common advertising technique is to provide a selected portion of a web page for displaying advertisements. This portion is usually at the top of a displayed page, where a potential purchaser will encounter it when the page is first loaded. If the person viewing the page is interested in the product or service depicted in the advertisement, usually clicking on the advertisement will take that person to another web page where the product or service can be purchased, or additional information found. This approach is often generally referred to as banner advertising, because the selected portion is a rectangular banner shape at the top of the page.

Numerous approaches are in use for selecting the particular ads to be displayed to a particular customer. A common problem with many approaches is determining how effective they are, during and after an advertising campaign. Although various purchaser profiles can be selected in advance to determine which customers will be shown which advertisements, it is often difficult to find out after the fact whether the campaign was, in fact, effective.

It would be desirable to provide a system and method that not only allowed advertising campaigns to be defined, but that allowed the effectiveness of the campaign to be monitored. It would further be desirable for such a system and method to be compatible with current web-based Internet systems, and be easy to use.

SUMMARY OF THE INVENTION

In accordance with the present invention, events generated by customer interaction during an Internet-based session are made available for use by a system for tracking the effectiveness of web advertising campaigns. Event occurrences are collected for evaluation to determine whether campaign goals are being met. Campaigns are defined by rules indicating which ad content is to be displayed to which customers. Event types to be reported are selected depending on the needs of the particular campaign.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of illustrative embodiments when read in conjunction with the accompanying drawings, wherein:

DESCRIPTION OF THE PREFERRED EMBODIMENT

The present invention is described in the context of the following implementation. Those skilled in the art will recognize that numerous alternative implementations can be used to accomplish the following described results and goals.

Figure 1:
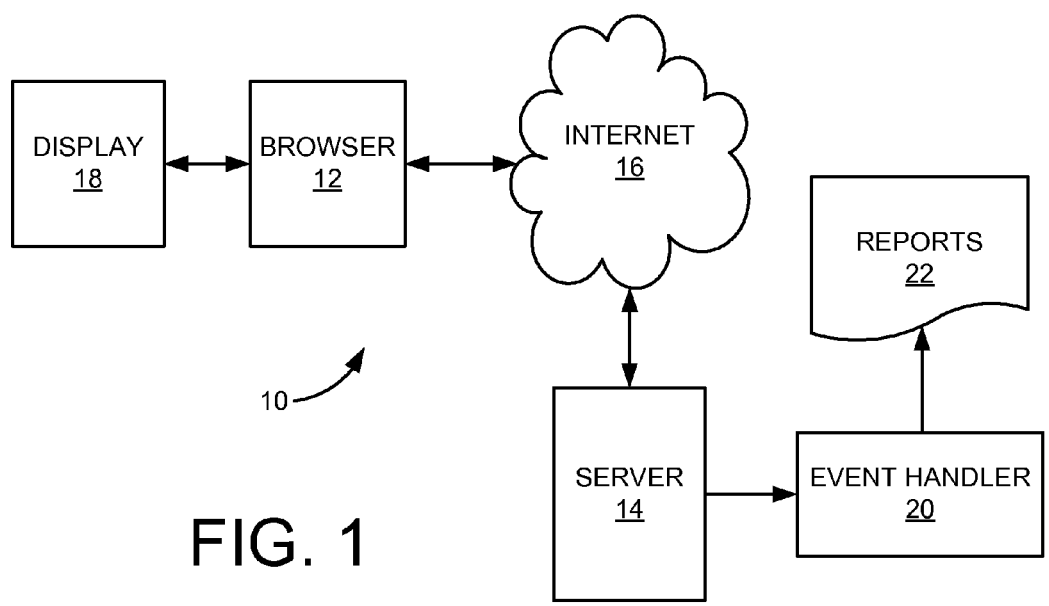
FIG. 1 is a block diagram of a communication system for use over the Internet.

FIG. 1 illustrates, at a high level, a typical system 10 used to implement a preferred embodiment. A browser 12, used by a customer, connects to a server 14 through the Internet 16, or other suitable communications network. Server 14 is responsible for responding to requests received from browser 12, and provides content to be displayed on display 18.

As described below, server 14 also provides advertisements to be displayed. The selection of advertisements to be displayed depends upon several factors, including what ad campaigns are currently in effect and who the customer is. In response to actions taken by the customer, selected events are generated by applications running on server 14, and are forwarded to event handler 20. In a preferred embodiment, event handler 20 is an application dedicated to supporting one or more advertising campaigns, and deals with the various events in a manner that will facilitate analysis of the effectiveness of the campaigns. Various reports 22 are generated using the data processed by event handler 20.

Figure 2:
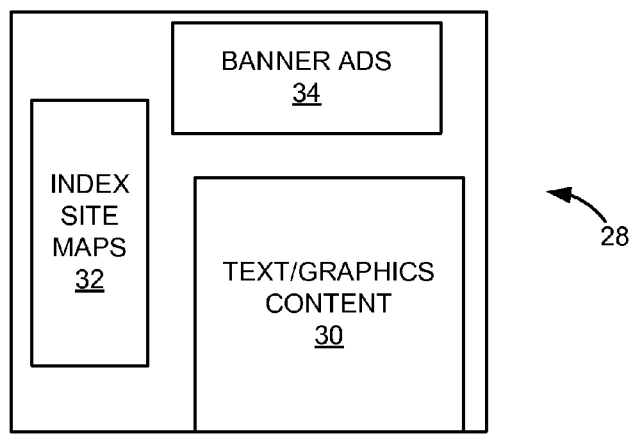
FIG. 2 is a simplified diagram of a display.

FIG. 2 shows a typical web page layout that is suitable for use in a preferred embodiment. Numerous alternative arrangements are known to those skilled in the art, but layout 28 will serve to demonstrate features of interest for all layouts. Typically, each web page includes content 30, which may include text, graphics, and additional items such as dialog boxes and various controls that may be manipulated by the viewer. It is common for index and other information 32 to be included in some portion of the page layout. For purposes of a preferred embodiment, a portion of the page is reserved for banner advertisements 34. As known in the art, such advertisements are generally selected dynamically, potentially being different for every different viewer of the same page.

Each time a page is selected for viewing, server 14 includes a graphic that will be located in the banner ad region 34. The graphic to be displayed is preferably selected according to campaign rules provided by a campaign manager (not shown). Each ad will have a type, and other information to enable effectiveness tracking to be performed, as described below. As is known in the art, a viewer can select (click on) the banner ad 34, and will be connected with another web page.

Figure 3:
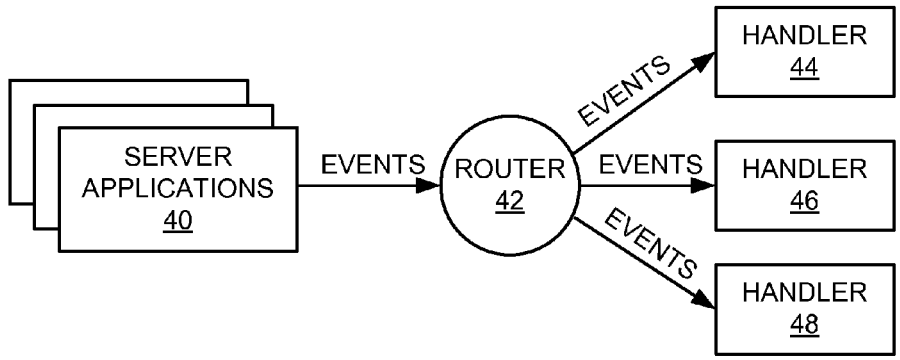
FIG. 3 is a block diagram of a system for handling events generated by numerous applications.

FIG. 3 illustrates a preferred technique for handling events such as those used to track the effectiveness of web advertising campaigns. Several server applications 40 execute on server 14, or associated hardware. During the course of that execution, various events occur that need to be reported. These events include those related to the advertising campaign, as well as others. In the preferred embodiment, every event generates a message to a router 42, which distributes them to event handler applications 44, 46, 48.

Event messages received by router 42 all have a type, and other identifying information. Handlers 44-46 register to receive events of selected types, with tables in router 42 maintaining the registration information. Several handlers can register to receive the same events, and router 42 forwards the messages to every registered handler each time an event is received from an application 40. Thus, the system shown in FIG. 3 is a generic event routing system that is also used for applications other than the web advertising campaign described herein.

Each campaign can have one or more handlers 44-46, or several campaigns can use the same handler. Correspondence of handlers to campaigns is selected to meet the needs of each installation. In a simple implementation, each separate campaign uses a separate event handler to deal with all events related to the campaign. When an advertising campaign is started, a new handler is defined and instantiated to handle events for that campaign. The handler registers with event router 42 to receive all events that are of interest to the campaign, as described below. Because different campaigns may be interested in different types of events, the use of a generic router 42 can simplify the overall implementation of the campaign management system. However, any system that can generate message as described below can be utilized to implement the effectiveness tracking system.

Figure 4:
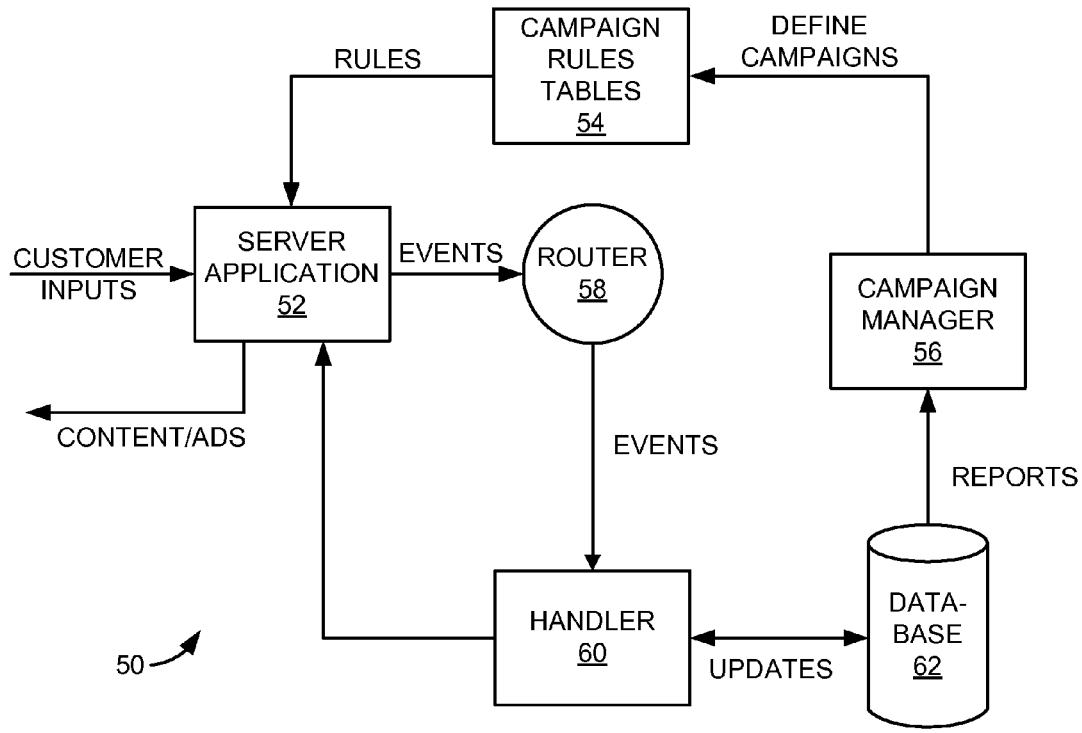
FIG. 4 is a block diagram of a preferred system for managing advertising campaigns.

FIG. 4 illustrates the major parts of a preferred system to implement and track advertising campaigns. Server application 52 receives customer inputs, and generates content to be returned to the customer over the Internet. The returned content includes advertisements for selected pages, and does not for others. As server application 52 generates events, messages are sent through router 58 to an event handler 60 designated for use by this campaign. Handler 60 verifies the events it receives, performs some processing on them and updates data stored in a database 62. For example, if handler 60 is registered to receive events generated when a customer actually purchases an advertised product, it can then update database 62 each time a purchase is made.

Server application 52 uses rules from rules tables 54 to determine which ads to include with the content being sent to the customer. These rules are defined by a campaign manager application 56, which works with one or more business users to define the campaigns to be run. The manager 56 also receives feedback from database 62; that feedback indicates how the campaign is doing. In response to such feedback, campaigns can be modified, cancelled, and so forth.

In addition, handler 60 can modify operation of content display handled by application 52. For example, a product discount can be given to those customers who purchase a product in response to the ad campaign. For example, an event referred to as a "click-through" occurs when a customer responds to a banner ad by clicking on it, and is taken to a page from which the product can be purchased. By watching for such click-through events, handler 60 can notify application 52 that a discount is to given to a customer for a session that generated the click-through. Other modifications can be made in response to campaign events, and can modify the content sent to customers, and the terms of the product sales, in a similar manner.

Each campaign therefore includes two major parts; a set of rules defining what ads will be shown and under what circumstances, and a selection of events to be retained to analyze the results of the campaign. The business user managing the campaign has a number of capabilities to manage it. These include defining ad content and associating it with products. Also included is the ability to associate discounts with a click-through as described above. Rules can be defined to evaluate system and customer data, which then allows ads to be displayed for selected customers meeting certain criteria. Criteria can be based on customer information, including individual information such as personal buying history. It may also be based on broader profiles, such as age, sex, and income.

A campaign is made up of sets of rules used to define what products are covered, what discounts, if any, will be offered and to whom, to whom the ads will be displayed, and a time period in which the campaign is active. Additional rules may be included if desired. Default ad content must be defined in the system so that all banners contain ad content. If none of the ad campaigns currently in effect match a rule, the default content can be displayed.

Campaigns are preferably defined for specified dates and time periods. A campaign can also be defined until specified events, internal or external, occur. For example, if a campaign is run to sell products in an overstock condition, the campaign can be defined to run until the overstock condition disappears. In a similar manner, rules can preferably be defined that take into consideration conditions in the supply chain. A sale can be suspended if suppliers run into short supply on sale items or components for them. A campaign can be suspended at any time in response to input from a person working with the campaign manager application 56.

Generally several campaigns will be running concurrently. It is possible that several campaigns will contain rules that would call for ad banners to be displayed for more than one at a given time. Such conflicts can be handled by additional rules that define a preference for one over the other. Another approach is to define a weighting factor, so that overlapping campaigns will share ad time before the customer base. Such scheduling and preference algorithms are generally known in the art, and will not be described here in detail.

A campaign also specifies what will be tracked in order to determine its effectiveness. This can involve simple data collection, such as collecting only the number of times a banner for the product is displayed and the number of purchases made of the product. Somewhat more sophisticated information will generally be desired, however. For example, a count of the number of click-throughs that occur tends to indicate the actual effectiveness of an ad banner. Also, subsequent purchases by the same customer who viewed an ad banner is more useful than a simple count of sales. Data tracking the number of inquiries for detailed information in response to a click-through, and the time such information is displayed before being replaced by another page, can provide highly detailed information regarding the success of the campaign in attracting customer attention.

Although click-throughs have been described in conjunction with ad banners at the top of a web page, it will be recognized by those skilled in the art that ad content can be displayed in other circumstances. For example, when a customer is browsing through products or services offered by a business, indications of special offers can be displayed in any format. Selection (click-through) for these indicators acts in a manner similar to that described above for banner ads. In fact, in many campaigns, the rules for display of special offers and sales will limit ad display to customers who have already shown that they are serious about buying from the company. In a similar manner, one common rule that can be used to define a campaign is to make special offers to customers who have already purchased one or more products, or placed them in a shopping cart for purchase.

As described above, numerous types of events are used to control the campaign, and to track its effectiveness. Some events are used primarily for campaign control, while others are used for effectiveness tracking. Many events are used for both, depending on the rules used to control the campaign, and the degree of tracking desired. Some of the types of events preferably included are:

Session start and session end, when a session is established or completed for a customer. A timestamp is preferably included.

Authentication, when a user is successfully identified.

Begin shopping and end shopping, when a user enters or leaves a shopping workflow.

Product details requested, when so requested by a user.

Events indicating that a product is added to, or removed from, the customer's shopping cart.

Purchase of a product, or order of a product to be shipped.

Beginning or ending a product configuration session.

An impression event when an ad is rendered for a customer.

Profile match, when a profile match is found as a result of a rules evaluation.

Click-through events for any click-throughs, including those for up-sell ads and cross-sell ads.

Remote system events, including click-through to a remote URL, and a referral from another domain to the local domain.

Effectiveness tracking may only apply to some of the above events. The selected events can vary from campaign to campaign. Occurrences of selected events are logged in tables provided for the purpose in database 62, and statistical evaluations can be created and studied at leisure through the campaign manager application 56. If any events are not recognized by handler 60 when they are received, they can be included in a table reserved for unrecognized or otherwise untracked events.

Tracking events for a campaign can be turned on and off independently from a campaign itself. This can be useful when tracking data is not needed, or only a subset is needed. Once a campaign has been shown to be satisfactorily effective, tracking can be minimized, or even eliminated except for periodic reviews. This simplifies reporting by avoiding the need to record every event when doing so is not very useful.

To attain the above objectives requires only minimal modification of existing code. Events, or a similar reporting system, are already included in most sophisticated web hosting system. They need merely be modified to ensure that an appropriate handler receives them for effectiveness tracking to be implemented. Defining the campaign is a little more complicated, but again can be done without significantly altering existing code.

In addition, each web page must have an area set aside to display the campaign content. In many cases, this is already provided. In other systems, an area will need to be set aside for campaign content to be inserted. In either case, a default content, which could be blank, can be used whenever no campaigns are active, or whenever no campaigns are triggered to include an ad by the rules used to define the campaign.

The described system allows the effectiveness of the campaign to be easily tracked by capturing events and storing them to a database or other persistent storage. Once the appropriate raw data has been collected, it is easily analyzed using widely available techniques to indicate to a business whether or not the campaign is actually effective, and how quickly its goals are being reached.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for managing an advertising campaign, comprising:

registering a first event handler to receive event messages of a first event type from among a plurality of event types, wherein each of the plurality of event types is a distinct type of event resulting from one or more occurrences related to a web page that is associated with user interaction with the web page;

registering a second event handler to receive event messages of a second event type from among the plurality of event types and not of the first event type from among the plurality of event types, wherein event messages of the first event type result from occurrences related to a first type of ecommerce activity on the web page and event messages of the second event type result from occurrences related to a second type of ecommerce activity on the web page;

receiving input from a user of the web page via a communications network, wherein display content of the web page is generated by one or more display applications executing on one or more servers and is transmitted to the user via the communications network;

determining, based on the received input, one or more events associated with web page activity of the user to be events defined by the advertising campaign;

one or more server applications executing on the one or more servers generating a first event message of the first event type based on a first determined event of the determined events, including associating the first event message with the first event type and identifying the first event message as the first event type by including identifying information in the first event message;

the one or more server applications executing on the one or more servers generating a second event message of the second event type based on a second determined event of the determined events, including associating the second event message with the second event type and identifying the second event message as the second event type by including identifying information in the second event message;

forwarding at least the first event message to the first event handler;

forwarding at least the second event message to the second event handler;

the first event handler modifying operation of the one or more display applications, based on the forwarded first event message being of the first event type, to generate first modified display content comprising at least a first advertisement from the advertising campaign;

the second event handler modifying operation of the one or more display applications, based on the forwarded second event message being of the second event type, to generate second modified display content comprising at least a second advertisement from the advertising campaign; and transforming the display content of the web page to comprise at least one of the first modified display content and the second modified display content to present at least one of the first advertisement and the second advertisement to the user via the communications network.

2. The method of claim 1, wherein two or more of the plurality of event handlers are registered to receive event messages of the first event type and further comprising forwarding each event message associated with the one or more identified events associated with the first event type to each of the two or more of the plurality of handlers registered to receive event messages of the first event type.

3. The method of claim 1, wherein modifying includes modifying the display content to present one or more users of the one or more users an option to purchase a product or service at a discount from a regular price for such purchase.

4. The method of claim 1, wherein a plurality of advertising campaigns are associated with the first event handler, and wherein the first event handler modifies operation of the one or more display applications, based on the forwarded first event message, to generate the first modified display content comprising at least a third advertisement from one of the advertising campaigns of the plurality of advertising campaigns and at least a fourth advertisement from another of the advertising campaigns of the plurality of advertising campaigns, wherein the third advertisement is different from the fourth advertisement.

5. The method of claim 1, wherein the first event handler registers with an event router to be associated with the advertising campaign and wherein the event router routes event messages associated with the one or more identified events related to the advertising campaign of the first event type to the first event handler.

6. The method of claim 1, wherein the first event handler updates a database upon receipt of each event message of the first event type.

7. The method of claim 1, wherein the advertising campaign is comprised of a set of rules used to define applicability of the first advertisement for display content, further comprising a campaign manager application, executing on the one or more servers and having access to a database updated by the first event handler, modifying the set of rules based on updates from the first event handler.

8. The method of claim 1, further comprising generating display content associated with the advertising campaign and providing the generated display content to at least one of the one or more users of the web page.

9. The method of claim 1, further comprising selecting the first advertisement from the advertising campaign based on an identity of the at least one user of the one or more users.

10. The method of claim 1, wherein the first event handler of the plurality of event handlers is registered to receive event messages of the first event type from among the plurality of event types and not event messages of the second event type from among the plurality of event types.

11. A system comprising:
one or more servers that generates display content of a web page for transmission to one or more users of the web page via a communications network, wherein the one or more servers receive input from the one or more users via the communications network, and wherein the one or more servers are configured to determine, based on the received input, one or more events associated with web page activity of at least one user of the one or more users to be one or more identified events related to an advertising campaign, wherein the one or more identified events is associated with one or more event types from among a plurality of event types, wherein each of the plurality of event types is a distinct type of event that results from one or more occurrences related to a web page;

a first event handler registered to receive event messages of at least a first event type of the plurality of event types;

a second event handler registered to receive event messages of at least a second event type of the plurality of event types and not of the first event type from among the plurality of event types, wherein event messages of the first event type result from occurrences related to a first type of ecommerce activity on the web page and event messages of the second event type result from occurrences related to a second type of ecommerce activity on the web page;

one or more server applications executing on the one or more servers generating one or more event messages based on the determined one or more identified events related to the advertising campaign, and further associating the one or more event messages with the one or more event types associated with the determined one or more identified events and identifying each event type of each one or more event messages by including identifying information in the one or more event messages; and an event router, receiving the one or more event messages, that forwards at least one of the received one or more event messages to the first event handler when the received one or more event messages is associated with the first event type, and that forwards at least one of the received one or more event messages to the second event handler when the received one or more event messages is associated with the second event type;

wherein the first event handler provides first input received by the one or more servers, based on the forwarded one or more event messages of the first event type, and the one or more servers generate first modified display content comprising at least a first advertisement from the advertising campaign in response to the first input;

wherein the second event handler provides second input received by the one or more servers, based on the forwarded one or more event messages of the second event type, and the one or more servers generates second modified display content comprising at least a second advertisement from the advertising campaign in response to the second input; and wherein the one or more servers transmits display content comprising at least one of the first modified display content and the second modified display content to the at least one user of the one or more users via the communications network.

12. The system of claim 11, further comprising a plurality of event handlers registered to receive event messages of the first event type and further wherein the event router forwards each event message associated with the one or more identified events associated with the first event type to each of the plurality of handlers registered to receive event messages of the first event type.

13. The system of claim 11, wherein the one or more servers modifies the display content to present one or more users of the one or more users an option to purchase a product or service at a discount from a regular price for such purchase.

14. The system of claim 11, wherein a plurality of advertising campaigns are associated with the first event handler, and wherein the first event handler modifies operation of the one or more display applications, based on the forwarded first event message, to generate the first modified display content comprising at least a third advertisement from one of the advertising campaigns of the plurality of advertising campaigns and at least a fourth advertisement from another of the advertising campaigns of the plurality of advertising campaigns, wherein the third advertisement is different from the fourth advertisement.

15. The system of claim 11, wherein the first event handler registers with the event router to be associated with the advertising campaign and wherein the event router routes event messages associated with the one or more identified events related to the advertising campaign of the first event type to the first event handler.

16. The system of claim 11, further comprising a database coupled to the first event handler, wherein the first event handler updates the database upon receipt of each event message of the first event type.

17. The system of claim 11, wherein the advertising campaign is comprised of a set of rules used to define applicability of the first advertisement for display content, further comprising a campaign manager application executing on the one or more servers and having access to a database updated by the first event handler, wherein the campaign manager application modifies the set of rules based on updates to the database by the first event handler.

18. The system of claim 11, wherein the first advertisement is selected from the advertising campaign for display content based on an identity of the at least one user of the one or more users.

19. The system of claim 11, further comprising a plurality of event handlers including the first event handler and the second event handler, wherein the first event handler of the plurality of event handlers is registered to receive event messages of the first event type from among the plurality of event types and not event messages of the second event type from among the plurality of event types.

20. A non-transitory machine readable storage medium containing machine readable instructions that when executed causes a data processing system to perform a method, comprising:
registering a first event handler to receive event messages of a first event type from among a plurality of event types, wherein each of the plurality of event types is a distinct type of event that results from one or more occurrences related to a web page and associated with user interaction with the web page;
registering a second event handler to receive event messages of a second event type from among the plurality of event types and not of the first event type from among the plurality of event types, wherein event messages of the first event type result from occurrences that are not the same as occurrences that result in event messages of the second event type;
receiving input from a user of the web page via a communications network, wherein display content of the web page is generated by one or more display applications executing on one or more servers and is transmitted to the user via the communications network;
determining, based on the received input, a plurality of events associated with web page activity of the user to be events defined by an advertising campaign;
one or more server applications executing on the one or more servers generating a first event message of the first event type based on a first determined event of the determined plurality of events, including associating the first event message with the first event type and identifying the first event message as the first event type by including identifying information in the first event message;
the one or more server applications executing on the one or more servers generating a second event message of the second event type based on a second determined event of the determined plurality of events, including associating the second event message with the second event type and identifying the second event message as the second event type by including identifying information in the second event message;
forwarding at least the first event message to the first event handler;
forwarding at least the second event message to the second event handler;
the first event handler modifying operation of the one or more display applications, based on the forwarded first event message being of the first event type, to generate first modified display content comprising at least a first advertisement from the advertising campaign;
the second event handler modifying operation of the one or more display applications, based on the forwarded second event message being of the second event type, to generate second modified display content comprising at least a second advertisement from the advertising campaign; and
transforming the display content of the web page to comprise at least one of the first modified display content and the second modified display content to present at least one of the first advertisement and the second advertisement to the user via the communications network.

21. A non-transitory machine readable storage medium of claim 20, wherein two or more of the plurality of event handlers are registered to receive event messages of the first event type and further comprising forwarding each event message associated with the one or more identified events associated with the first event type to each of the two or more of the plurality of handlers registered to receive event messages of the first event type.

22. A non-transitory machine readable storage medium of claim 20, wherein modifying includes modifying the display content to present one or more users of the one or more users an option to purchase a product or service at a discount from a regular price for such purchase.

23. A non-transitory machine readable storage medium of claim 20, wherein a plurality of advertising campaigns are associated with the first event handler, and wherein the first event handler modifies operation of the one or more display applications, based on the forwarded first event message, to generate the first modified display content comprising at least a third advertisement from one of the advertising campaigns of the plurality of advertising campaigns and at least a fourth advertisement from another of the advertising campaigns of the plurality of advertising campaigns, wherein the third advertisement is different from the fourth advertisement.

24. A non-transitory machine readable storage medium of claim 20, wherein the first event handler registers with an event router to be associated with the advertising campaign and wherein the event router routes event messages associated with the one or more identified events related to the advertising campaign of the first event type to the first event handler.

25. A non-transitory machine readable storage medium of claim 20, wherein the first event handler updates a database upon receipt of each event message of the first event type.

26. A non-transitory machine readable storage medium of claim 20, wherein the advertising campaign is comprised of a set of rules used to define applicability of the first advertisement for display content, further comprising a campaign manager application, executing on the one or more servers and having access to a database updated by the first event handler, modifying the set of rules based on updates from the first event handler.

27. A non-transitory machine readable storage medium of claim 20, further comprising generating display content associated with the advertising campaign and providing the generated display content to at least one of the one or more users of the web page.

28. A non-transitory machine readable storage medium of claim 20, further comprising selecting the first advertisement from the advertising campaign based on an identity of the at least one user of the one or more users.

29. A non-transitory machine readable storage medium of claim 20, wherein the first event handler of the plurality of event handlers is registered to receive event messages of the first event type from among the plurality of event types and not event messages of the second event type from among the plurality of event types.

* * * * *